United States Patent [19]

Chu

[11] 4,208,142
[45] Jun. 17, 1980

[54] PRINT HEAD LOCATING UTILIZING SONIC TECHNIQUES

[75] Inventor: Mosi Chu, Setauket, N.Y.

[73] Assignee: Burroughs Corporation, Detroit, Mich.

[21] Appl. No.: 965,089

[22] Filed: Nov. 30, 1978

[51] Int. Cl.² .............................................. B41J 19/00
[52] U.S. Cl. ................................... 400/320; 400/322; 400/328
[58] Field of Search ........................ 400/320, 322, 328

[56] References Cited

U.S. PATENT DOCUMENTS

| | | | |
|---|---|---|---|
| 3,892,303 | 7/1975 | Willcox | 400/172 X |
| 3,898,555 | 8/1975 | Tellerman | 324/208 |
| 4,044,881 | 8/1977 | Chai et al. | 400/320 X |
| 4,058,195 | 11/1977 | Fravel et al. | 400/322 X |

Primary Examiner—Clifford D. Crowder
Attorney, Agent, or Firm—Hane, Roberts, Spiecens & Cohen

[57] ABSTRACT

In a printer having a print head assemblage longitudinally moving along a path parallel to a record medium, a portion of the print head assemblage is controlled to strike the record medium at a desired point by measuring the time required for sonic pulses generated in a rod at the position of the print head assemblage to arrive at a sensor, such time being a function of the distance from the print head assemblage to the sensor. A representation of this time is compared against a similar representation of a time associated with the position of the desired point and upon equality the portion of the print head assemblage is driven toward the record medium.

6 Claims, 3 Drawing Figures

PRINT HEAD LOCATING UTILIZING SONIC TECHNIQUES

BACKGROUND OF THE INVENTION

This invention pertains to printers and more particularly indicating when a print head assemblage which is moving longitudinally parallel to a record medium is to strike the record medium.

Most printers with longitudinally moving print heads are carefully positioned for each print step so that a nearly perfectly registered copy is obtained. Such printers because of their step to step operation or precise positioning are relatively slow operating or require complicated servo systems.

In order to minimize these problems there have been proposed on-the-fly printers wherein at every instant the position of the print head is known. Such printers require complex speed control systems or complex position indicating systems. The latter class of systems fall under two types. Those utilizing magnetic position sensing are represented by U.S. Pat. Nos. 4,082,944; 4,044,881; 3,858,702; and 3,434,581. Those utilizing optical position sensing are represented by U.S. Pat. Nos. 4,076,111 and 3,882,988. Neither of these types satisfy the need for a simple, inexpensive highly precise and very reliable position indicating system.

SUMMARY OF THE INVENTION

Briefly, the invention contemplates, in a printer having a print head assemblage longitudinally movable along a path parallel to a record medium, controlling a portion of the print head assemblage to strike the record medium at a desired particular point along the path. The control is accomplished by storing a first time quantity which is a function of the distance of the desired particular point from a given reference point followed by periodically generating sonic pulses which start from the actual position of the print head assemblage and generating a second time quantity directly related to the time for a sonic pulse to travel from its point of generation to the reference point. When the first and second time quantities are equal the portion of the print head assemblage is urged toward the record medium.

BRIEF DESCRIPTION OF THE DRAWING

The objects, features and advantages of the invention will be apparent from the following detailed description when read with the accompanying drawing which shows by way of example, and not limitation apparatus for practicing the invention. In the drawing.

DESCRIPTION OF THE PREFERRED EMBODIMENT

Figure 1:
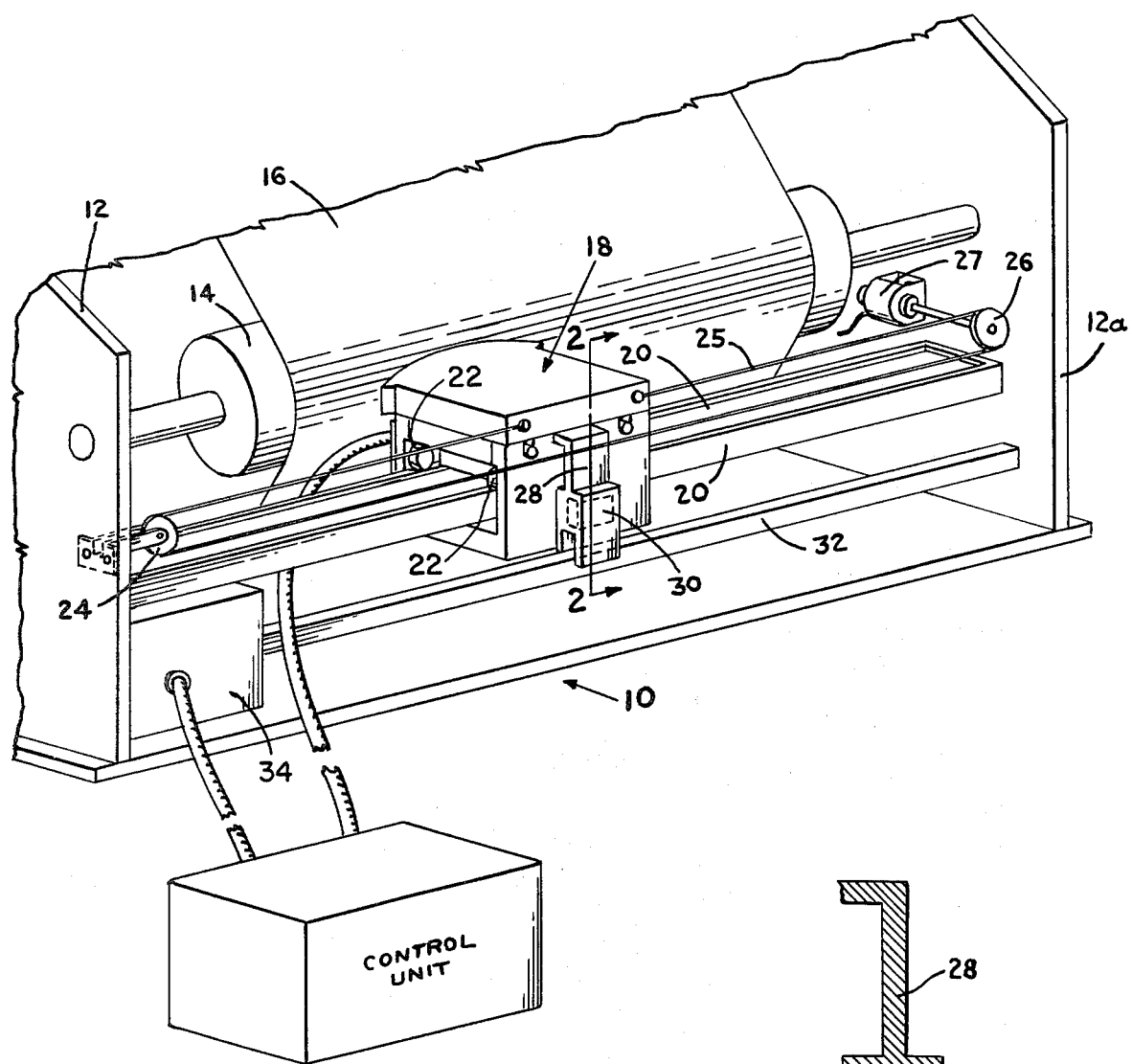
FIG. 1 is a perspective view of a printer utilizing the invention.

In FIG. 1 the printer 10 has a frame 12 which supports a roller or platen 14 against which rests paper or record medium 16. A print head assemblage 18 moves, via rollers 22, on a twin railed support 20 longitudinally opposite the paper 16.

Movement is obtained by a drive system in the form of cable 25 (having ends fixed to head assemblage 18) and pulleys 24 and 26 (fixed to opposite walls of the frame 12) with one of the pulleys being driven by a rotary drive member 27. Although many print head assemblages can be used I prefer to use a matrix type print head such as Diablo Matrix Printer Head No. 24800-02 which whenever it receives control pulses fires a coded combination of pins against a ribbon which impacts with the record medium. Since neither the details of the drive system nor the print head form any part of the invention they will not be described in detail.

Extending down from the print head part of the assemblage 18 is a bracket 28 which carries a permanent magnet 30. The bracket 28 straddles a beam 32 extending parallel to the platen 14 and the path of travel of the assemblage 18.

Figure 2:
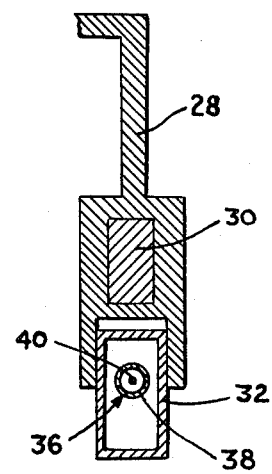
FIG. 2 is a cross-section taken along the line 2—2 of FIG. 1.
Figure 3:
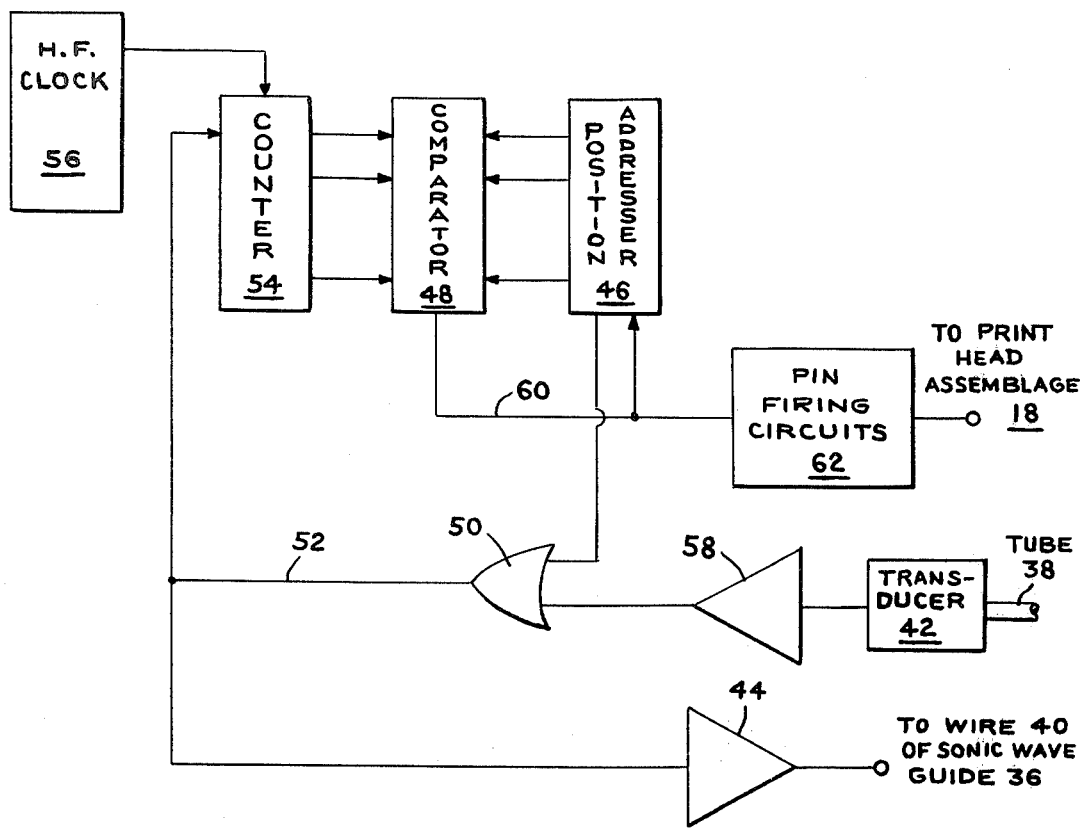
FIG. 3 is a block diagram of apparatus for controlling the printer of FIG. 1.

The beam 32 has one end fixed to wall 12A of frame 12 and another end terminated in transducer housing 34. Within beam 32 (see FIG. 2) is a sonic wave guide 36 in the form of a hollow tube 38 of ferromagnetic material through which passes a wire 40 of electrically conductive material. In general, the end of the tube 38 adjacent wall 12A is dampingly mounted while the other end is connected to a torsion-to-voltage transducer 42 (FIG. 3) in housing 34. Also, the corresponding ends of wire 40 are grounded and connected to an electric pulse amplifier 44 within housing 34 (FIG. 3).

In operation, an electric pulse is fed onto wire 40 and it travels with electromagnetic velocity toward the grounded end. As it travels it generates a magnetic field. When this magnetic field interacts with the magnetic field established by magnet 30 a magnetostrictive torsional pulse (a sonic pulse) is induced in the tube 38 at the position of the magnet. This pulse now propagates toward both ends of the tube. When it arrives at transducer 42 it is converted to an electrical signal. Since the time for travel of the electrical pulsedown wire 40 is effectively zero, the time between the generation of the pulse by amplifier 44 (FIG. 3) and the time the transducer 42 generates the electrical signal is in effect the time of travel of the sonic pulse from magnet 30 (point of generation) to transducer 42 (reference point). Because the propagation velocity is known and constant, knowing this time is equivalent to knowing the position of the print head assemblage. Since the sonic techniques are well known and fully described in U.S. Pat. No. 3,898,555, the details on damping the sonic pulses and converting such pulses to signals will not be further described. In fact, the array of the transducer and sonic waveguide are commercially available by Tempo Instrument Inc., Plainview, New York.

Normally, in operation one knows that the propagation velocity is $0.273 \times 10^6$ cm/sec. Knowing this fact and deciding what resolution is needed say 0.001 in. one must then measure time intervals to a precision of 10 ns period. The time intervals are measured by counting pulses from a clock having a frequency of $100 \times 10^{+6}$ Hz.

The operation of the system will now be described, assuming the print head assemblage is moving from left to right in FIG. 1 utilizing FIG. 3. The desired position address unit 46 emits a number representing the time required for a sonic pulse to travel from a desired position of the assemblage 18 (i.e. the place where a character should be printed) to the transducer 42. This number which is stored until changed is fed to one side of comparator 48. At the same time addresser 46 feed a pulse via OR-circuit 50 to line 52. The pulse on line 52 is amplified by amplifier 44 and fed to wire 40 for launching down the guide 36. At the same time, the pulse on line 52 clears binary counter 54 to zero so it starts counting clock pulses from high frequency clock 56. These pulses have a frequency of $100 \times 10^{+6}$ Hz. When the return sonic pulse reaches transducer 42 it generates an electrical pulse which is fed via amplifier 58 to OR-circuit 50 and the cycle repeats as long as the count in counter 54 is lower than the number stored in addresser 46. Finally, during the cycle when the print head assemblage is passing the desired position, the count in the counter 54 will equal the number stored in addresser 46 and comparator 48 will emit a pulse on line 60 which signals addresser 46 to give a new desired address and energizes the pin firing circuits 62 for causing the printing of the character.

It should be noted that all circuits are given by way of example. The actual addressing can take other forms such as free running low frequency counter whereby the path of the assemblage is divided into character spaces or the like. In addition, the pin firing circuits include information to indicate which pins are to be fired in accordance with the character to be printed. Furthermore, it is not necessary to print entire characters at a time but only one column of dots of the matrix which forms the character.

While only one embodiment of the invention has been shown and described in detail, there will now be obvious to those skilled in the art many modifications and variations satisfying many or all of the objects of the invention without departing from the spirit thereof as defined by the appended claims.

What is claimed is:

1. In a printer having a print head assemblage longitudinally moving along a path parallel to a record medium, the method of controlling a portion of the print head assemblage to strike the record medium at a desired particular point along the path while said head assemblage is moving, said method comprising the steps of storing a first time quantity which is a function of the distance of the desired particular point from a given reference point, periodically generating sonic pulses which start from the actual position of the print head assemblage, generating a second time quantity directly related to the time for a sonic pulse to travel from its point of generation to the reference point, and urging the portion of the print head assemblage to strike the record medium when said second time quantity equals the stored first time quantity.

2. The method of claim 1 wherein said step of periodically generating sonic pulses comprises providing a magnetic field source on the print head assemblage, providing an electrical and sonic conductor means adjacent the path of movement of the print head assemblage, and periodically emitting electrical pulses which travel along said conductor means whereby a sonic pulse is generated in said conductor means when influenced by the magnetic field from said source.

3. A printer comprising: platen means for supporting a record medium; a print head assemblage, means for mounting said print head assemblage longitudinally along a path parallel to said platen means, said print head assemblage including printing means operable in response to a control signal for striking said platen means and magnetic means for generating a magnetic field; an elongated sonic cable means extending along another path parallel to said platen means and disposed such that for each position of said print head assemblage a region of said member is under the influence of a magnetic field generated by said magnetic means such that, in the region of said member under influence of a magnetic field generated by said magnetic means, a sonic pulse is launched from that region to one end of said sonic cable means; measuring means for measuring the time required for such a sonic pulse to travel from said region to said end; and control signal emitting means for emitting a control signal while said print head assemblage is moving to said printing means when said measuring means measures a time directly related to a desired position of said print head assemblage along the path parallel to said platen means whereby indicia is recorded on-the-fly.

4. The printer of claim 3 wherein sonic cable means also includes electrical conductor means and electrical pulse generating means for emitting periodically occurring electrical pulses down said electric conductor means whereby when an electrical pulse reaches said region the magnetic field generated by said electrical pulse interacts with that generated by said magnetic means to launch said sonic pulse.

5. The printer of claim 3 or 4 wherein said measuring means includes means for generating a periodically recurring clock pulse, counting means for counting the clock pulses, and means for initializing said counting means each time a sonic pulse is launched.

6. The printer of claim 5 wherein said control signal emitting means comprises desired time storing means for storing a count related to the time for a sonic pulse to travel from the region of the launching to said one end of said sonic means, and means comparing the stored count and the count being accumulated by said counting means for generating the control signal when a predetermined particular relationship exists between the counts.

* * * * *